UNITED STATES PATENT OFFICE.

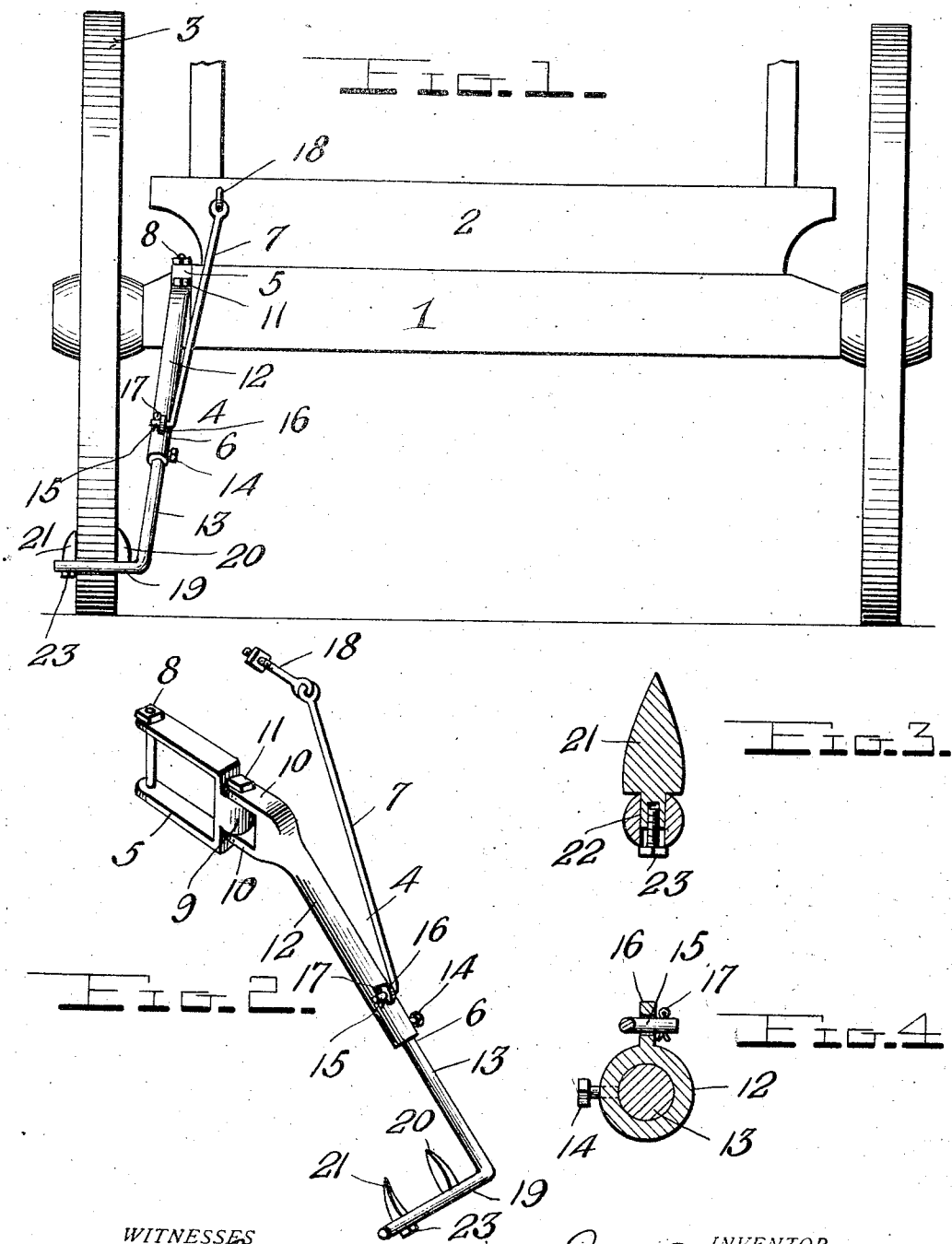

JESSE O. DAVISON, OF MURRAY, IOWA.

MUD-SCRAPER FOR WHEELS.

940,859.

Specification of Letters Patent. Patented Nov. 23, 1909.

Application filed May 29, 1909. Serial No. 499,110.

*To all whom it may concern:*

Be it known that I, JESSE O. DAVISON, a citizen of the United States, residing at Murray, in the county of Clarke and State of Iowa, have invented certain new and useful Improvements in Mud-Scrapers for Wheels, of which the following is a specification, reference being had to the accompanying drawings.

This invention is a mud scraping or removing device for wheels of wagons and other vehicles.

The object of the invention is to provide a simple and practical device of this character which may be produced at a small cost and will be durable in use and effective in operation, and which may be readily adjusted to permit of its use upon vehicles having wheels of different sizes.

With the above and other objects in view, the invention consists of the novel features of construction and the combination and arrangement of parts hereinafter fully described and claimed, and illustrated in the accompanying drawings, in which—

Figure 1 is a rear view of a portion of a wagon showing the application of the invention thereto; Fig. 2 is a perspective view of the device removed from the wagon; and Figs. 3 and 4 are detail sectional views.

In the drawings 1 denotes an axle, 2 a bolster, and 3 a wheel of a wagon or other vehicle, and 4 denotes my improved mud scraper which is in the form of an attachment for ready application to and removal from wagons of different sizes and constructions. The device or attachment consists of a clamp 5 for engagement with the axle 1, a longitudinally adjustable body 6 having one end connected to the clamp and its other end carrying an adjustable scraper to co-act with the wheel 3, and a brace 7 for supporting the body 6. Said clamp 5 is preferably of U-shape to straddle the axle 1 on which latter it is removably secured by a bolt 8 passed through the apertured ends of its spaced arms. The closed end of the U-shaped clamp 5 is formed with a hinged eye 9 which is arranged between spaced hinged eyes 10 formed upon one end of the body 6, a hinged bolt 11 passing through said eyes 9, 10 to pivotally unite the body to the clamp. The body 6 is made longitudinally extensible by constructing it of a tubular inner section 12 to telescopically receive an outer section 13, said section being retained in adjusted position by means of a set screw 14, as shown. The brace rod 7 has its lower end bent at a right angle to provide a pivot 15 which is arranged in an apertured ear or lug 16 on the section 12 of the body and retained therein by a split pin 17. The other end of the brace rod 7 is formed with an eye engaged with an eye bolt 18 which is arranged in one end of the bolster 2. The outer end of the section 13 of the body is bent outwardly at an angle to provide a scraper member 19 which removes mud from the periphery or tire of the wheel 3. On the inner portion of said scraper member 19 is a stationary side scraper member 20 to engage the inner edge of the wheel and on the outer portion of said member 19 is adjustably mounted a similar scraper member or blade 21 which engages the outer edge of the wheel. The adjustable scraper 21 has a portion which slides in a longitudinal slot 22 formed in the member 19 and it is held in adjusted position by a set screw 23. It will be seen that the adjustable scraper blade 21 permits the device to be used in connection with wheels having treads of different sizes and the adjustment of the body 6 permits the use of the invention on wheels of different diameters.

From the foregoing it will be seen that the invention provides an exceedingly simple and practical device of this character which may be readily applied to and removed from wagons, or other vehicles of different sizes and construction.

Having thus described the invention, what is claimed is:

A mud scraper comprising a U-shaped clamp to receive an axle and formed at its closed end with an apertured lug, a tubular body member formed at one end with an enlarged bifurcated portion to receive said lug, a pivot uniting said bifurcated portion of the body to said lug, a second body member of right angular shape having a long end slidable in the tubular portion of the first body member, the short end of said second member being longitudinally slotted, a set screw for retaining the body members in adjusted position, an eye bolt for attachment to a bolster, a link pivotally connected to the first body member and loosely engaged with said eye bolt, a fixed scraper blade upon the short end of the second body, and an adjustable scraper having a reduced shouldered end to slide in the slot in the short end of said second body member, a clamping screw passed through said slotted end of the second body member and into the reduced end of said adjustable scraper blade.

In testimony whereof I hereunto affix my signature in the presence of two witnesses.

JESSE O. DAVISON.

Witnesses:
 A. B. MILLER,
 O. M. SLAYMAKER.